(12) United States Patent
Ferris

(10) Patent No.: US 8,937,404 B1
(45) Date of Patent: Jan. 20, 2015

(54) DATA STORAGE DEVICE COMPRISING DUAL MODE INDEPENDENT/PARALLEL VOLTAGE REGULATORS

(75) Inventor: Timothy A. Ferris, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 891 days.

(21) Appl. No.: 13/157,228

(22) Filed: Jun. 9, 2011

Related U.S. Application Data

(60) Provisional application No. 61/375,984, filed on Aug. 23, 2010.

(51) Int. Cl.
  *H02J 1/10* (2006.01)
(52) U.S. Cl.
  USPC .............................................. 307/53; 307/29
(58) Field of Classification Search
  USPC ...................................................... 307/53, 29
  See application file for complete search history.

(56) References Cited

U.S. PATENT DOCUMENTS

| | | | |
|---|---|---|---|
| 4,675,617 A | 6/1987 | Martin | |
| 4,737,670 A | 4/1988 | Chan | |
| 4,766,364 A | 8/1988 | Biamonte et al. | |
| 4,822,144 A | 4/1989 | Vriens | |
| 4,922,141 A | 5/1990 | Lofgren et al. | |
| 5,146,121 A | 9/1992 | Searles et al. | |
| 5,440,250 A | 8/1995 | Albert | |
| 5,440,520 A | 8/1995 | Schutz et al. | |
| 5,479,119 A | 12/1995 | Tice et al. | |
| 5,612,610 A | 3/1997 | Borghi et al. | |
| 5,629,610 A | 5/1997 | Pedrazzini et al. | |
| 5,638,019 A | 6/1997 | Frankeny | |
| 5,661,422 A | 8/1997 | Tice et al. | |
| 5,747,976 A | 5/1998 | Wong et al. | |
| 5,748,050 A | 5/1998 | Anderson | |
| 5,777,567 A | 7/1998 | Murata et al. | |
| 5,787,292 A | 7/1998 | Ottesen et al. | |
| 5,808,455 A | 9/1998 | Schwartz et al. | |
| 5,994,885 A | 11/1999 | Wilcox et al. | |
| 6,055,287 A | 4/2000 | McEwan | |
| 6,125,157 A | 9/2000 | Donnelly et al. | |
| 6,157,247 A | 12/2000 | Abdesselem et al. | |

(Continued)

FOREIGN PATENT DOCUMENTS

WO  90/13079  1/1990

OTHER PUBLICATIONS

Intersil, "Microprocessor Core Voltage Regulator Precision Multi-Phase Buck PWM Controller for Mobile Applications", Mar. 20, 2007, http://www.intersil.com/data/fn/fn9093.pdf.

(Continued)

*Primary Examiner* — Jared Fureman
*Assistant Examiner* — Dru Parries

(57) ABSTRACT

A data storage device (DSD) is disclosed comprising a non-volatile memory (NVM), and control circuitry comprising a first voltage regulator having a first output operable to generate a first current, and a second voltage regulator having a second output operable to generate a second current. When in an independent mode, the first current is operable to supply a first load independent of the second current, and the second current is operable to supply a second load independent of the first current. When in a parallel mode, the second output is coupled to the first output in order to increase the first current supplied to the first load and decrease the second current supplied to the second load.

22 Claims, 5 Drawing Sheets

(56) References Cited

U.S. PATENT DOCUMENTS

| | | | |
|---|---|---|---|
| 6,259,293 | B1 | 7/2001 | Hayase et al. |
| 6,285,263 | B1 | 9/2001 | Anderson |
| 6,333,652 | B1 | 12/2001 | Iida et al. |
| 6,356,062 | B1 | 3/2002 | Elmhurst et al. |
| 6,424,184 | B1 | 7/2002 | Yamamoto et al. |
| 6,425,086 | B1 | 7/2002 | Clark et al. |
| 6,449,575 | B2 | 9/2002 | Bausch et al. |
| 6,515,460 | B1 | 2/2003 | Farrenkopf |
| 6,525,585 | B1 | 2/2003 | Iida et al. |
| 6,535,735 | B2 | 3/2003 | Underbrink et al. |
| 6,577,535 | B2 | 6/2003 | Pasternak |
| 6,617,936 | B2 | 9/2003 | Dally et al. |
| 6,622,252 | B1 | 9/2003 | Klaassen et al. |
| 6,628,106 | B1 | 9/2003 | Batarseh et al. |
| 6,657,467 | B2 | 12/2003 | Seki et al. |
| 6,674,274 | B2 | 1/2004 | Hobrecht et al. |
| 6,693,473 | B2 | 2/2004 | Alexander et al. |
| 6,831,494 | B1 | 12/2004 | Fu et al. |
| 6,868,503 | B1 | 3/2005 | Maksimovic et al. |
| 6,870,410 | B1 | 3/2005 | Doyle et al. |
| 6,885,210 | B1 | 4/2005 | Suzuki |
| 6,909,266 | B2 | 6/2005 | Kernahan et al. |
| 6,958,552 | B2 | 10/2005 | Dodson, III |
| 6,987,380 | B1 | 1/2006 | Lee |
| 7,015,735 | B2 | 3/2006 | Kimura et al. |
| 7,042,202 | B2 | 5/2006 | Sutardja et al. |
| 7,061,292 | B2 | 6/2006 | Maksimovic et al. |
| 7,109,695 | B2 | 9/2006 | King |
| 7,129,763 | B1 | 10/2006 | Bennett et al. |
| 7,164,258 | B2 | 1/2007 | Umminger |
| 7,190,090 | B2 * | 3/2007 | Shi ................................. 307/18 |
| 7,205,805 | B1 | 4/2007 | Bennett |
| 7,317,305 | B1 | 1/2008 | Stratakos et al. |
| 7,330,019 | B1 | 2/2008 | Bennett |
| 7,421,593 | B2 | 9/2008 | Koertzen |
| 7,486,060 | B1 | 2/2009 | Bennett |
| 7,541,794 | B2 | 6/2009 | Tabaian et al. |
| 7,609,040 | B1 | 10/2009 | Jain |
| 7,688,607 | B2 | 3/2010 | Schultz |
| 2003/0093160 | A1 | 5/2003 | Maksimovic et al. |
| 2004/0257056 | A1 | 12/2004 | Huang et al. |
| 2005/0134391 | A1 | 6/2005 | Kimura et al. |
| 2005/0140418 | A1 | 6/2005 | Muniandy et al. |
| 2005/0218871 | A1 | 10/2005 | Kang et al. |
| 2005/0218877 | A1 | 10/2005 | Oswald et al. |
| 2007/0200538 | A1 | 8/2007 | Tang et al. |
| 2008/0024007 | A1 * | 1/2008 | Budampati et al. ............. 307/19 |
| 2008/0238380 | A1 | 10/2008 | Jain |
| 2009/0174388 | A1 | 7/2009 | Kung et al. |
| 2010/0001708 | A1 | 1/2010 | Dobkin |
| 2010/0134085 | A1 | 6/2010 | Nishida |

OTHER PUBLICATIONS

T. D. Burd, et al., "A Dynamic Voltage Scaled Microprocessor System," IEEE Journal of Solid-State Circuits, vol. 35, No. 11, pp. 1571-1580, Nov. 2000.

Gu-Yeon Wei, et al., "A Fully Digital, Energy-Efficient, Adaptive Power-Supply Regulator," IEEE Journal of Solid-State Circuits, vol. 34, No. 4, pp. 520-528, Apr. 1999.

Anthony John Stratakos, "High-Efficiency Low-Voltage DC-DC Conversion for Portable Applications," pp. 1, 124-129, 177-183, 188-191, Ph.D. Dissertation, University of California, Berkley, Dec. 1998.

Aleksandar Prodic, et al., "Mixed-Signal Simulation of Digitally Controlled Switching Converters," IEEE Compel, pp. 100-105, Jun. 2002.

Jinwen Xiao, et al., "A 4-μA Quiescent-Current Dual-Mode Digitally Controlled Buck Converter IC for Cellular Phone Applications," IEEE Journal of Solid-State Circuits, vol. 39, No. 12, pp. 2342-2348, Dec. 2004.

Shamim Choudhury, "Designing a TMS320F280x Based Digitally Controlled DC-DC Switching Power Supply," Texas Instruments Application Report, http://focus.ti.com, spraab3.pdf, pp. 1-16, Jul. 2005.

Marc Fleischmann, "Long Run Power Management, Dynamic Power Management for Crusoe Processors," Transmeta Corporation, pp. 1-18, Jan. 17, 2001.

Alexander Klaiber, "The Technology Behind Crusoe Processors, Low-Power x86-Compatible Processors Implemented with Code Morphing Software," Transmeta Corporation, pp. 1-18, Jan. 2000.

"Applications for White LED Driver in Parallel vs. Series," Analog Integrations Corporation (AIC), AIC1845, AN027.pdf, www.analog. com, pp. 1-7, Oct. 2003.

"Power Supply Regulation," printout from Altera website, http://www.altera.com/support/devices/power/regulators/pow-regulators. html, Oct. 2006.

David Morrison, "Dual Buck Regulator Allows Flexible Load Sharing", Jul. 1, 2006, http://powerelectronics.com/mag/power_dual_buck_regulator.

* cited by examiner

US 8,937,404 B1

DATA STORAGE DEVICE COMPRISING DUAL MODE INDEPENDENT/PARALLEL VOLTAGE REGULATORS

CROSS-REFERENCE TO RELATED APPLICATIONS

The present application claims priority from provisional U.S. Patent Application Ser. No. 61/375,984, filed on Aug. 23, 2010, the specification of which is incorporated herein by reference.

BACKGROUND

Data storage devices (DSDs), such as disk drives and solid state drives are employed in numerous areas such as computer systems (e.g., desktops, laptops, portables, etc.) and consumer devices (e.g., music players, cell phones, cameras, etc.). User data is typically stored in a non-volatile memory, such as a magnetic disk or a non-volatile semiconductor memory (e.g., Flash memory). A DSD manufacturer may produce different lines of DSDs (e.g., different lines of a disk drive or solid state drive) wherein the control circuitry of each line may require a varying number of regulated voltages at different power levels. For example, a core logic integrated circuit (IC) may comprise a different number of power islands (e.g., one, two, or three power islands) depending on the line of core logic IC employed, wherein the power level required by each power island may decrease as the number of power islands increases.

DETAILED DESCRIPTION OF EMBODIMENTS OF THE INVENTION

Figure 1A:
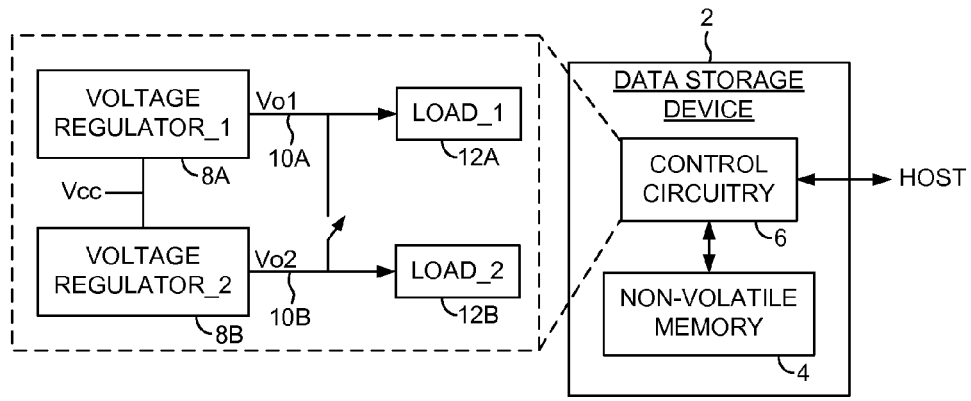
FIG. 1A shows a data storage device (DSD) according to an embodiment of the present invention comprising a non-volatile memory and control circuitry comprising a first voltage regulator for supplying a first load, and a second voltage regulator for supplying a second load.
Figure 1B:
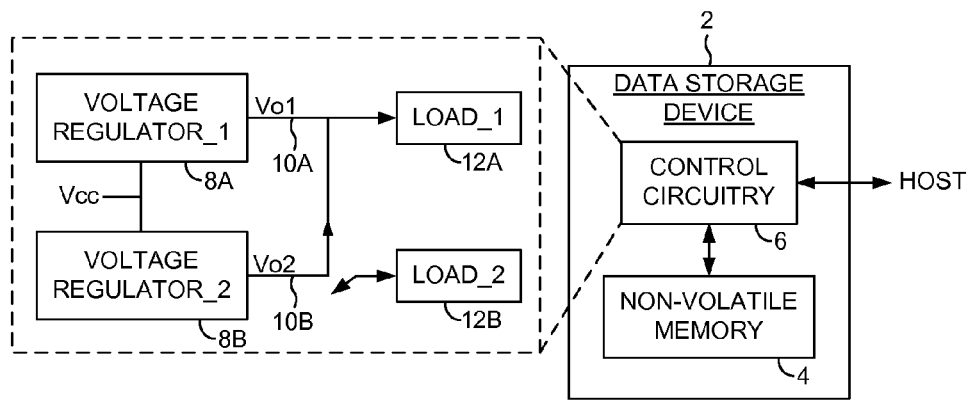
FIG. 1B shows a DSD according to an embodiment of the present invention wherein switches are configured to couple an output of the second voltage regulator to an output of the first voltage regulator in order to increase the current supplied to the first load.
Figure 1C:
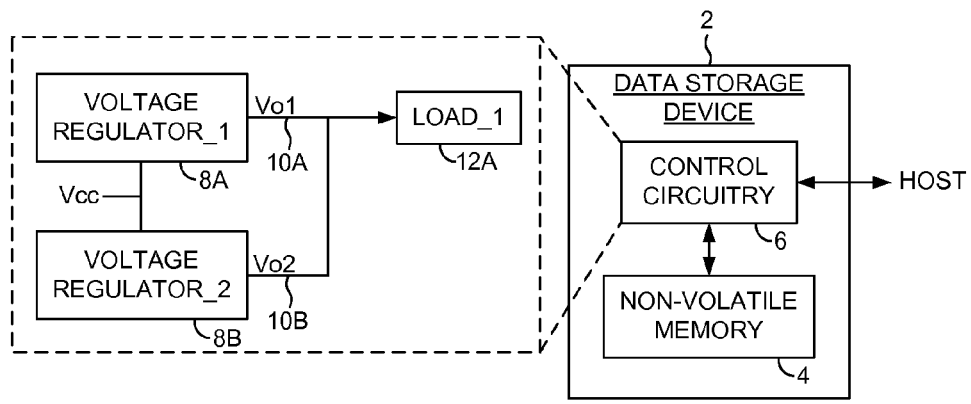
FIG. 1C shows a DSD according to an embodiment of the present invention wherein the control circuitry is fabricated with traces that couple the output of the second voltage regulator to the output of the first voltage regulator in order to increase the current supplied to the first load.

FIGS. 1A-1C show a data storage device (DSD) 2 according to an embodiment of the present invention comprising a non-volatile memory (NVM) 4, and control circuitry 6 comprising a first voltage regulator 8A having a first output 10A operable to generate a first current, and a second voltage regulator 8B having a second output 10B operable to generate a second current. When in an independent mode (FIG. 1A), the first current is operable to supply a first load 12A independent of the second current, and the second current is operable to supply a second load 12B independent of the first current. When in a parallel mode (FIG. 1B or 1C), the second output 10B is coupled to the first output 10A in order to increase the first current supplied to the first load 12A and decrease the second current supplied to the second load 12B.

In the embodiment shown in FIGS. 1A and 1B, the control circuitry 6 comprises switches for configuring the voltage regulators into one of the independent and parallel mode. In one embodiment, the switches are programmably configured, and in another embodiment, the switches are manually configured, for example, using any suitable dip switches or jumpers. With programmable configuration circuitry, the voltage regulators may be configured to operate in different modes within the same DSD, for example, in an embodiment where the DSD comprises different components that may be active at different times (e.g., when accessing a disk or a non-volatile semiconductor memory). In other embodiments, the load requirements in the DSD are static requiring a single configuration for the voltage regulators (independent or parallel mode). Therefore, the voltage regulators may be configured during manufacturing of the DSD (e.g., using dip switches or jumpers) or during manufacturing of the control circuitry 6 based on the number of loads to be supplied in each line of DSDs. For example, FIG. 1C shows an embodiment where the control circuitry 6 is fabricated with at least one trace that couples the second output 10B to the first output 10A for supplying a first load whereas the second load is non-existent for the particular DSD being manufactured.

The embodiments of the present invention allow the same power circuit to be employed in different lines of DSD products. For example, a first line of DSD products may require two regulated voltages to supply two independent loads, whereas a second line of DSD products may require a single regulated voltage to supply a single load having a higher current requirement. Instead of fabricating custom voltage regulators for each line of DSD products, the power circuit of the present invention can be configured to accommodate both lines.

In one embodiment, the power circuit may be integrated with other control circuitry, including the loads supplied by the voltage regulators. In an alternative embodiment, the power circuit may be fabricated in an integrated circuit (power IC) separate from the loads wherein output pins couple the outputs of the voltage regulators to the loads. For example, in one embodiment the power IC may comprise two output pins for supplying up to two loads, and configuration circuitry (e.g., internal switches, dip switches, jumpers, etc.) for configuring the voltage regulators into one of the independent or parallel modes. When the power IC is installed into a first line of DSDs having two loads, the power circuit is configured into the independent mode, and when the power IC is installed into a second line of DSDs having a single load, the power circuit is configured into the parallel mode. Accordingly, in one embodiment when in the parallel mode decreasing the current to the second load involves removing the second load for a particular line of DSDs. With a non-existent second load (output pin of the power IC left open), zero current is supplied to the second load.

The embodiments shown in FIGS. 1A-1C show two voltage regulators for supplying independent loads or a single load; however, the embodiments of the present invention may include any suitable number of voltage regulators that may supply current independently at a lower current or in parallel at a higher current. For example, an embodiment of the present invention may comprise three voltage regulators that may be configured to supply three loads independently, two regulators configured in parallel to supply a higher current to a first load and the third regulator supplying a lower current to a second load, or all three regulators configured in parallel to supply maximum current to a single load.

Figure 2A:
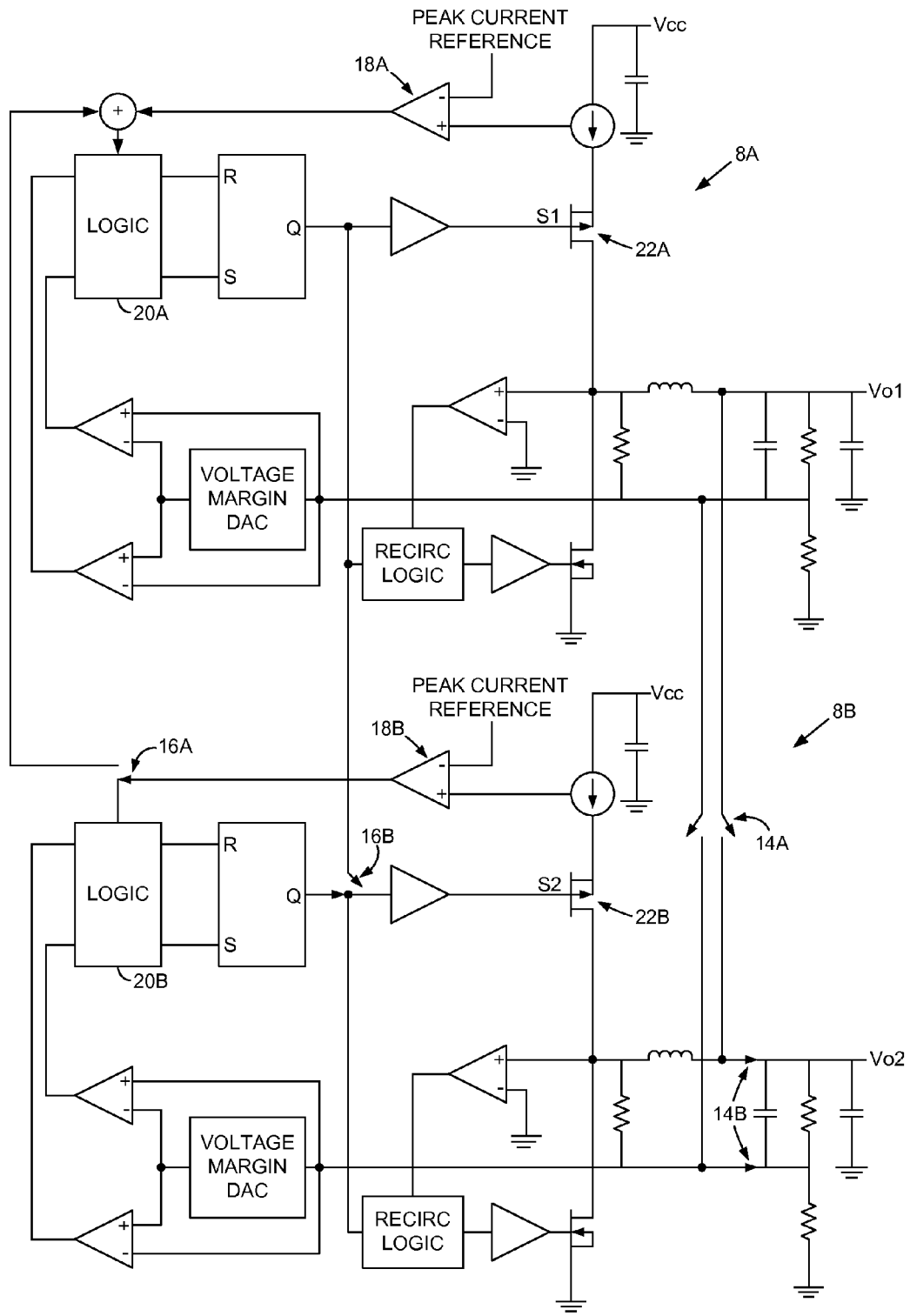
FIG. 2A shows details of first and second switching regulators according to an embodiment of the present invention each supplying a separate load.
Figure 2B:
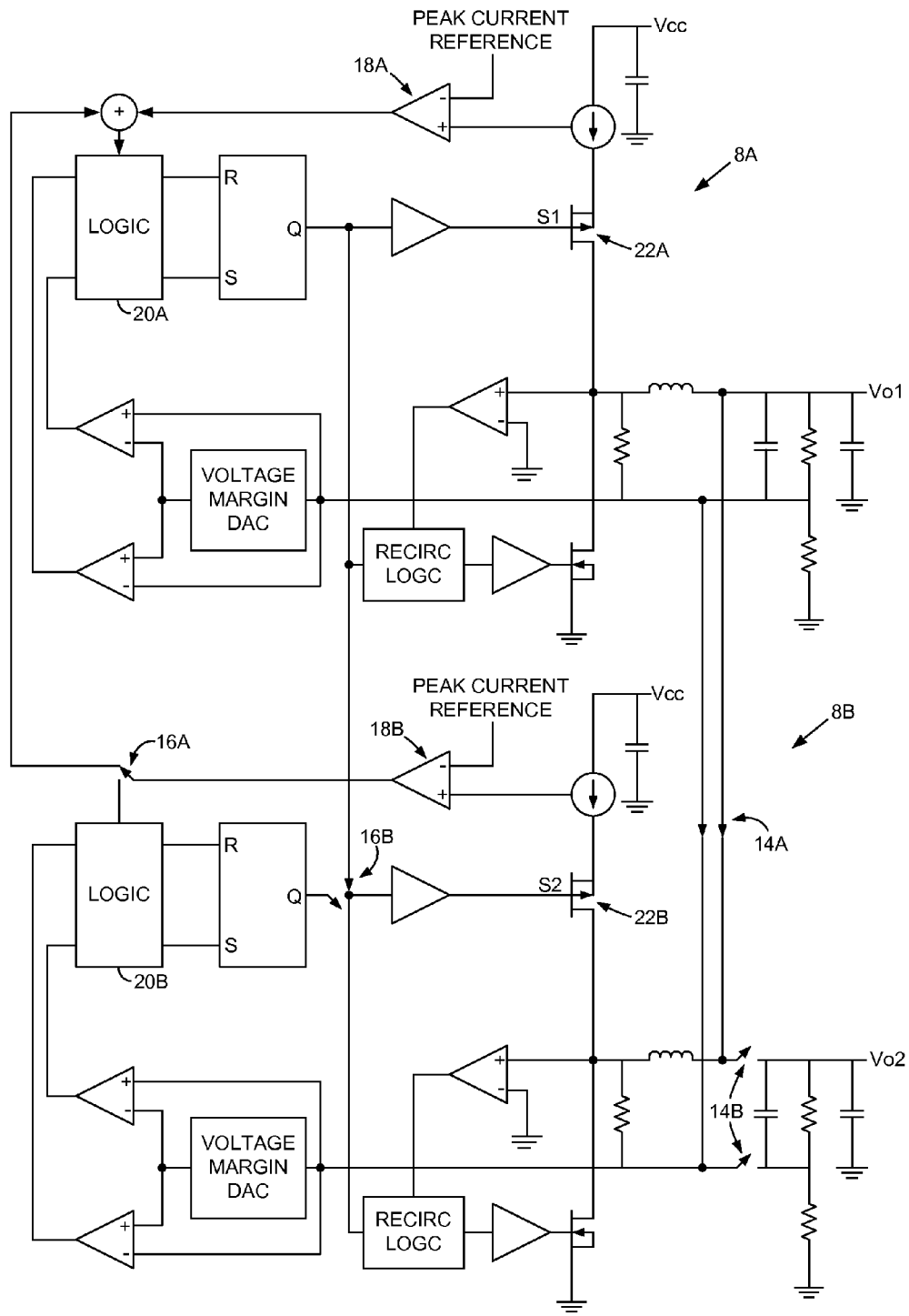
FIG. 2B shows details of first and second switching regulators with outputs coupled according to an embodiment of the present invention to increase the current supplied to a single load.

Any suitable voltage regulators 8A and 8B may be employed in the embodiments of the present invention, such as any suitable linear regulator or any suitable switching regulator (buck, boost, buck-boost, etc.). FIG. 2A shows an embodiment of the present invention wherein each voltage regulator 8A and 8B comprises a buck mode switching regulator. In the example shown in FIG. 2A, switches 14A are open and switches 14B are closed so that each output voltage Vo1 and Vo2 independently supply current to a respective first and second load. In addition, switches 16A and 16B are configured so that the switching circuitry operate independently, including a peak current detector 18A and 18B and switching logic 20A and 20B. FIG. 2B shows an embodiment wherein switches 14A are closed in order to couple the output of the second voltage regulator 8B to the output of the first voltage regulator 8A, and switches 14B are opened in order to disconnect the output of the second voltage regulator 8B from a second load. In an alternative embodiment, the second load is removed or non-existent such that switches 14B are unneeded. Also in the embodiment of FIG. 2B, switch 16A and 16B are configured so that the switching logic 20A of the first voltage regulator 8A controls operation of the second voltage regulator 8B.

Figure 3A:
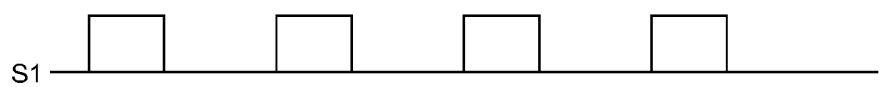
FIG. 3A shows an embodiment of the present invention wherein first and second in-phase periodic switch signals drive respective switching voltage regulators.
Figure 3A:
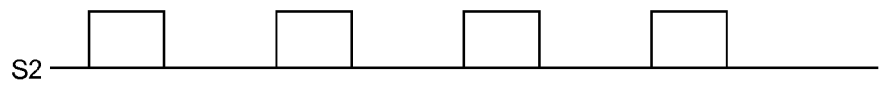
Figure 3B:
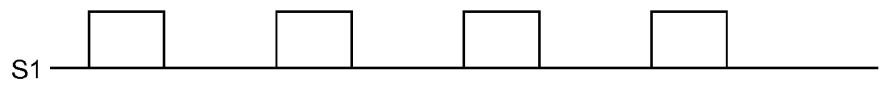
FIG. 3B shows an embodiment of the present invention wherein first and second out-of-phase periodic switch signals drive respective switching voltage regulators.
Figure 3B:
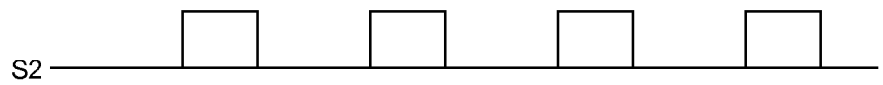

FIG. 3A shows an embodiment of the present invention wherein when the switching regulators are configured into the parallel mode as shown in FIG. 2B, the first periodic switch signal S1 of the first switching regulator 8A and the second periodic switch signal S2 of the second switching regulator 8A are in-phase such that the charging elements (inductors) of both regulators are simultaneously charged by a supply voltage Vcc when the switches 22A and 22B are turned on. In an alternative embodiment shown in FIG. 3B, the first and second periodic switch signals S1 and S2 are out-of-phase so that only one of the charging elements is charged for at least part of the time. The embodiment of FIG. 3B shows a phase shift between the periodic switch signals S1 and S2 such that both switches 22A and 22B are never on together. Other embodiments may employ an overlap of the periodic switch signals at least part of the time, and in embodiments employing more than two voltage regulators configured in parallel, the periodic switch signals may be generated using any suitable phasing such that there is no overlap, or some overlap of at least two of the periodic switch signals for at least part of the time.

Figure 4:
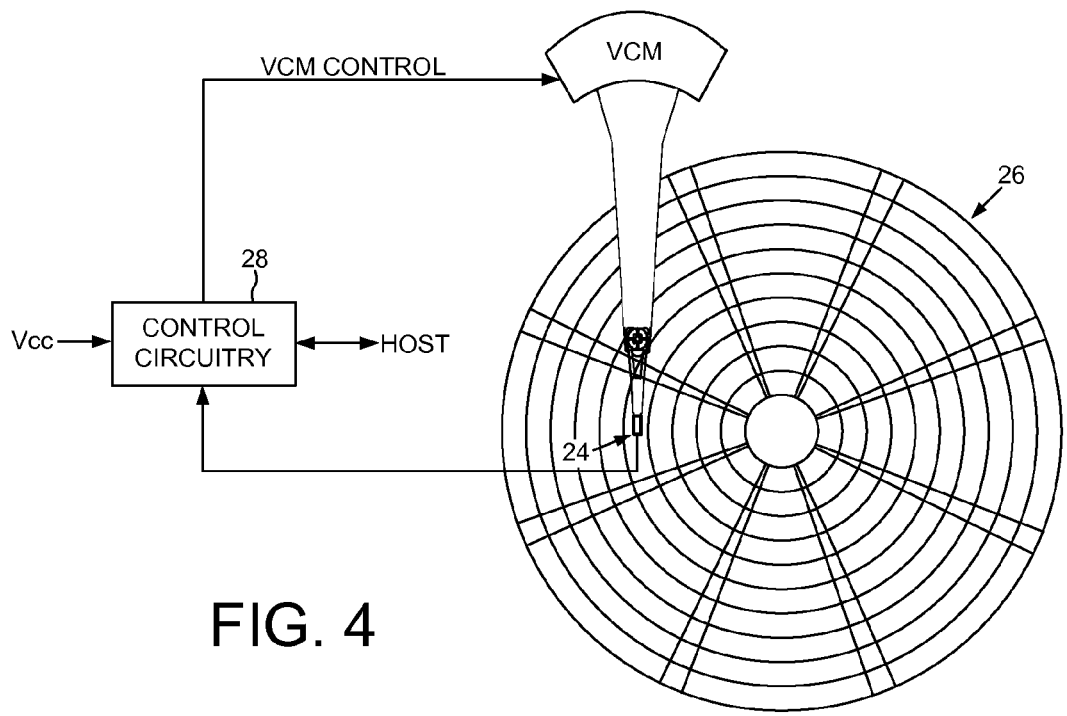
FIG. 4 shows an embodiment of the present invention wherein the non-volatile memory of the DSD comprises a disk.
Figure 5:
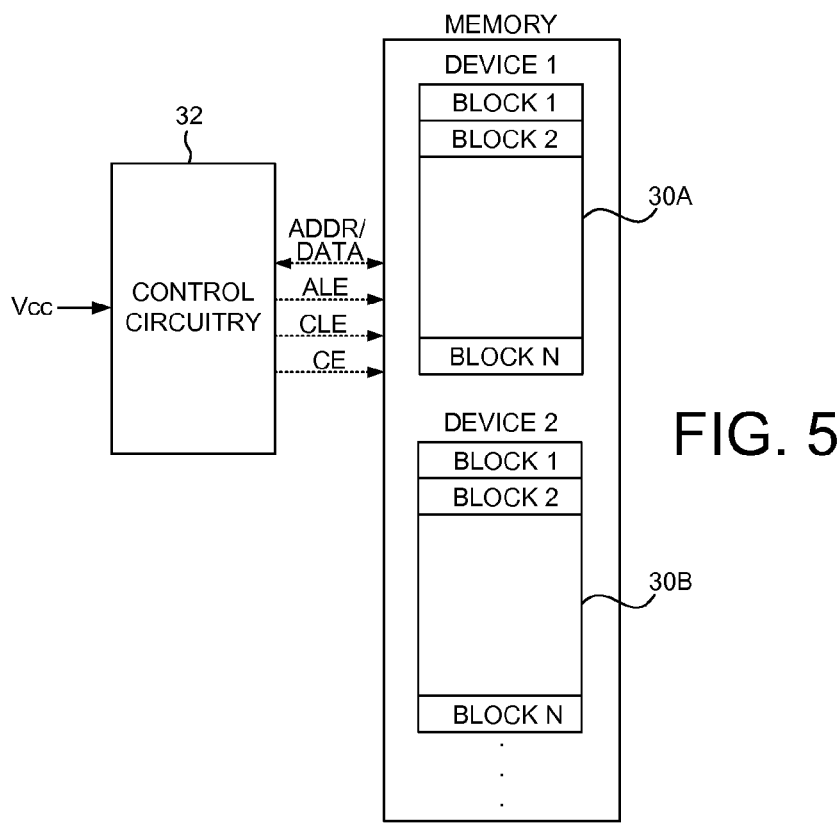
FIG. 5 shows an embodiment of the present invention wherein the non-volatile memory of the DSD comprises a non-volatile semiconductor memory.

The embodiments of the present invention may be employed in any suitable DSD comprising any suitable non-volatile memory. FIG. 4 shows a DSD comprising a disk drive including a head 24 actuated over a disk 26 and control circuitry 28 including an embodiment of the power circuit described herein. FIG. 5 shows a DSD comprising a solid state drive including a plurality of non-volatile semiconductor memories 30A, 30B, etc., such as flash memories, and control circuitry 32 including an embodiment of the power circuit described herein. A hybrid DSD may also be employed comprising components of a disk drive shown in FIG. 4 combined with the non-volatile semiconductor memories shown in FIG. 5.

What is claimed is:

1. A data storage device (DSD) comprising:
a non-volatile memory (NVM); and
control circuitry comprising:
a first voltage regulator comprising a first output operable to generate a first current;
a second voltage regulator comprising a second output operable to generate a second current; and
configuration circuitry for configuring the first and second voltage regulators into one of an independent mode and a parallel mode, wherein:
when in the independent mode, the first current is operable to supply a first load independent of the second current, and the second current is operable to supply a second load independent of the first current; and
when in the parallel mode, the second output is coupled to the first output in order to increase the first current supplied to the first load and decrease the second current supplied to the second load, wherein:
the first voltage regulator comprises a first switching regulator comprising first switching logic;
the second voltage regulator comprises a second switching regulator comprising second switching logic;
when in the independent mode, the first switching logic is configured to control the first switching regulator and the second switching logic is configured to control the second switching regulator; and
when in the parallel mode, the first switching logic is configured to control the first switching regulator and the second switching regulator.

2. The data storage device as recited in claim 1, wherein when in the parallel mode the second current is substantially zero.

3. The data storage device as recited in claim 1, wherein the configuration circuitry comprises programmable switches.

4. The data storage device as recited in claim 1, wherein the configuration circuitry comprises a fabricated trace.

5. The data storage device as recited in claim 1, wherein:
the first switching regulator comprises a first periodic switch signal; and
the second switching regulator comprises a second periodic switch signal.

6. The data storage device as recited in claim 5, wherein the first and second switch signals are in-phase.

7. The data storage device as recited in claim 5, wherein the first and second switch signals are out-of-phase.

8. The data storage device as recited in claim 1, wherein the NVM comprises a disk.

9. The data storage device as recited in claim 1, wherein the NVM comprises a non-volatile semiconductor memory.

10. A method of operating data storage devices (DSDs), each DSD comprising a non-volatile memory (NVM) and control circuitry comprising:
a first voltage regulator comprising a first output operable to generate a first current; and
a second voltage regulator comprising a second output operable to generate a second current;

the method comprising:
when in an independent mode, supplying a first load with the first current independent of the second current, and supplying a second load with the second current independent of the first current; and
when in a parallel mode, coupling the second output to the first output in order to increase the first current supplied to the first load and decrease the second current supplied to the second load,
wherein:
the first voltage regulator comprises a first switching regulator comprising first switching logic;
the second voltage regulator comprises a second switching regulator comprising second switching logic;
when in the independent mode, the first switching logic is configured to control the first switching regulator and the second switching logic is configured to control the second switching regulator; and
when in the parallel mode, the first switching logic is configured to control the first switching regulator and the second switching regulator.

11. The method as recited in claim 10, wherein when in the parallel mode the second current is substantially zero.

12. The method as recited in claim 10, wherein coupling the second output to the first output comprises configuring switches.

13. The method as recited in claim 10, wherein coupling the second output to the first output comprises fabricating a trace.

14. The method as recited in claim 10, wherein:
the first switching regulator comprises a first periodic switch signal; and
the second switching regulator comprises a second periodic switch signal.

15. The method as recited in claim 14, wherein the first and second switch signals are in-phase.

16. The method as recited in claim 14, wherein the first and second switch signals are out-of-phase.

17. The method as recited in claim 10, wherein the NVM comprises a disk.

18. The method as recited in claim 10, wherein the NVM comprises a non-volatile semiconductor memory.

19. A power circuit comprising:
a first voltage regulator comprising a first output operable to generate a first current;
a second voltage regulator comprising a second output operable to generate a second current; and
configuration circuitry for configuring the first and second voltage regulators into one of an independent mode and a parallel mode, wherein:
when in the independent mode, the first current is operable to supply a first load independent of the second current, and the second current is operable to supply a second load independent of the first current; and
when in the parallel mode, the second output is coupled to the first output in order to increase the first current supplied to the first load and decrease the second current supplied to the second load,
wherein:
the first voltage regulator comprises a first switching regulator comprising first switching logic;
the second voltage regulator comprises a second switching regulator comprising second switching logic;
when in the independent mode, the first switching logic is configured to control the first switching regulator and the second switching logic is configured to control the second switching regulator; and
when in the parallel mode, the first switching logic is configured to control the first switching regulator and the second switching regulator.

20. The power circuit as recited in claim 19, wherein:
the first switching regulator comprises a first periodic switch signal; and
the second switching regulator comprises a second periodic switch signal.

21. The power circuit as recited in claim 20, wherein the first and second switch signals are in-phase.

22. The power circuit as recited in claim 20, wherein the first and second switch signals are out-of-phase.

* * * * *